(12) United States Patent
Wils et al.

(10) Patent No.: US 7,277,953 B2
(45) Date of Patent: Oct. 2, 2007

(54) INTEGRATED PROCEDURE FOR PARTITIONING NETWORK DATA SERVICES AMONG MULTIPLE SUBSCRIBERS

(75) Inventors: Joris J. Wils, Acton, MA (US); Beth K. Miaoulis, Stow, MA (US); Jack J. Stiffler, Marion, MA (US)

(73) Assignee: EMC Corporation, Hopkinton, MA (US)

( * ) Notice: Subject to any disclaimer, the term of this patent is extended or adjusted under 35 U.S.C. 154(b) by 619 days.

(21) Appl. No.: 10/124,630

(22) Filed: Apr. 17, 2002

(65) Prior Publication Data

US 2003/0004950 A1 Jan. 2, 2003

Related U.S. Application Data

(60) Provisional application No. 60/284,439, filed on Apr. 18, 2001.

(51) Int. Cl.
*G06F 15/16* (2006.01)
*G06F 15/173* (2006.01)
*G06F 7/04* (2006.01)

(52) U.S. Cl. ............... 709/229; 709/219; 709/225; 726/4

(58) Field of Classification Search ........ 709/223–229, 709/217–219
See application file for complete search history.

(56) References Cited

U.S. PATENT DOCUMENTS

| 5,606,668 | A | * | 2/1997 | Shwed ............... 713/201 |
| 5,835,726 | A | * | 11/1998 | Shwed et al. .......... 709/229 |
| 5,935,210 | A | * | 8/1999 | Stark ................ 709/224 |
| 6,047,377 | A | * | 4/2000 | Gong ................ 726/21 |
| 6,088,451 | A | * | 7/2000 | He et al. ............. 726/8 |
| 6,167,052 | A | * | 12/2000 | McNeill et al. ......... 370/399 |
| 6,202,156 | B1 | * | 3/2001 | Kalajan ............. 726/11 |

(Continued)

FOREIGN PATENT DOCUMENTS

WO WO 01/27709 A2 4/2001

OTHER PUBLICATIONS

Mayer et al., Fang: A Firewall Analysis Engine, 2000, IEEE, whole document.*

*Primary Examiner*—Joseph E. Avellino
(74) *Attorney, Agent, or Firm*—The Law Offices of Paul E. Kudirka

(57) ABSTRACT

A method and apparatus for partitioning network data services among multiple subscribers uses information stored in several tables to define a plurality of independent networks where each independent network comprises a set of access ports and a unique set of destination addresses and is logically separate from all other independent networks so that no information can pass from one independent network to another independent network. When a subscriber makes a request to use an independent network, a subscriber key that is based on the subscriber identity and the network access port is used to determine whether the subscriber has permission to use the independent network. If the subscriber has permission to use the independent network, information retrieved from the tables is used to determine whether the source subscriber or a destination subscriber has control over the resource. If a destination subscriber has control over the resource, using information in the request to identify a destination subscriber and a response port; and if the source subscriber has control over the resource, using the identity to determine whether the source subscriber can access the resource.

26 Claims, 7 Drawing Sheets

U.S. PATENT DOCUMENTS

| | | | |
|---|---|---|---|
| 6,226,678 B1 * | 5/2001 | Mattaway et al. | 709/230 |
| 6,408,336 B1 * | 6/2002 | Schneider et al. | 709/229 |
| 6,463,474 B1 * | 10/2002 | Fuh et al. | 709/225 |
| 6,496,935 B1 * | 12/2002 | Fink et al. | 713/201 |
| 6,891,824 B1 * | 5/2005 | Gordon | 370/352 |
| 6,957,261 B2 * | 10/2005 | Lortz | 709/226 |
| 7,036,113 B1 * | 4/2006 | Kumhyr | 717/142 |
| 7,140,039 B1 * | 11/2006 | Yemeni et al. | 726/9 |
| 2001/0012296 A1 * | 8/2001 | Burgess et al. | 370/392 |
| 2002/0083340 A1 * | 6/2002 | Eggebraaten et al. | 713/201 |

* cited by examiner

INTEGRATED PROCEDURE FOR PARTITIONING NETWORK DATA SERVICES AMONG MULTIPLE SUBSCRIBERS

RELATED APPLICATIONS

This application is related to, and claims priority of, U.S. provisional patent application Ser. No. 60/284,439, filed on Apr. 18, 2001 by Joris J. Wills, Beth K. Miaoulis and Jack J. Stiffler.

FIELD OF THE INVENTION

This invention relates to the provision of data services, including data storage services, from a centralized data center over a network to a plurality of data service subscribers, and the mechanisms for insuring that the provided services meet predefined security and quality of service goals.

BACKGROUND OF THE INVENTION

Data service centers provide subscribers access to a variety of data services using a variety of protocols. In many cases, these services involve access to a centralized database that may be comprised of multiple storage resources. The database to which the subscribers seek access generally stores both static and dynamic content including text and graphic files, video and animation files, digital music, digital libraries, stock market and individual portfolio reports, financial statements and many other types of information. The protocols used to access the stored information include Hypertext Transfer Protocol (HTTP), File Transfer Protocol (FTP), Transmission Control Protocol (TCP), User Datagram Protocol (UDP), Network File System (NFS), Web-based NFS (WebNFS), Small Computer System Interface (SCSI) and Common Internet File System (CIFS) protocols.

A typical data service center must usually make its services simultaneously available to large numbers of subscribers using various combinations of these protocols. Further, for each subscriber, the center must provide security services that prevent other subscribers from getting unauthorized access to the subscribers' data. The data center must further provide accounting services in order to bill subscribers for the services provided and to allow traffic profiling.

All of these services must be provided in accordance with predefined quality of service commitments as contracted with the subscribers. Further, the services must be performed in a differentiated manner, with each subscriber receiving the type of service to which it has subscribed.

Prior-art data service systems have used separate procedures for handling each of these various requirements individually. Prior-art data services systems have only very limited support for a plurality of subscribers. They do not provide for separate quality of service and accounting metrics. They provide only weak separation of access. Thus, in practice, data center administrators would have to construct a physically separate data service system for each subscriber, which would lead to significant increased capital expense, maintenance and administrative cost.

SUMMARY OF THE INVENTION

In accordance with the principles of the invention a method and apparatus for partitioning network data services among multiple subscribers uses information stored in several tables to define a plurality of independent networks where each independent network comprises a set of access ports and a unique set of destination addresses and is logically separate from all other independent networks so that no information can pass from one independent network to another independent network. When a subscriber makes a request to use an independent network a subscriber key which is based on the subscriber identity and the network access port is used to access information in the tables to determine whether the subscriber has permission to use the independent network.

If the subscriber has permission to use the independent network, information retrieved from the tables is used to determine whether the source subscriber or a destination subscriber has control over the resource. If a destination subscriber has control over the resource, using information in the request to identify a destination subscriber and a response port; and if the source subscriber has control over the resource, using the identity to determine whether the source subscriber can access the resource.

In accordance with another embodiment of the invention, an integrated procedure enables a data service system to provide two levels of security to ensure that unauthorized users do not get access to the system or to its protected resources. The first level of security is provided at the network interface into the system where users attempting to access the system are checked against a database of eligible users and admitted only if they have been entered into that database. A second security barrier is provided at the resource level where a second database is used to specify the system resources to which each user has access.

Quality of service commitments are addressed by parceling out system capacity based on a subscriber's service agreement, ensuring that no subscriber gets more than its share of that capacity at the expense of any other subscriber that might otherwise receive less than its fair share. In addition, each subscriber is allowed to specify how its capacity is to be allocated among its various sessions and the quality of service procedure guarantees fairness among a subscriber's sessions in accordance with those specifications. Finally, system resources are monitored and the results of this monitoring are used to prevent requests that cannot currently be serviced due to insufficient system resources from blocking service to those requests that can be serviced.

Other embodiments of the present invention also provide accounting features that enable each subscriber to the data service to monitor its system usage, both overall and broken down into its individual sessions.

BRIEF DESCRIPTION OF THE DRAWINGS

The above and further advantages of the invention may be better understood by referring to the following description in conjunction with the accompanying drawings in which.

DETAILED DESCRIPTION

Figure 1:
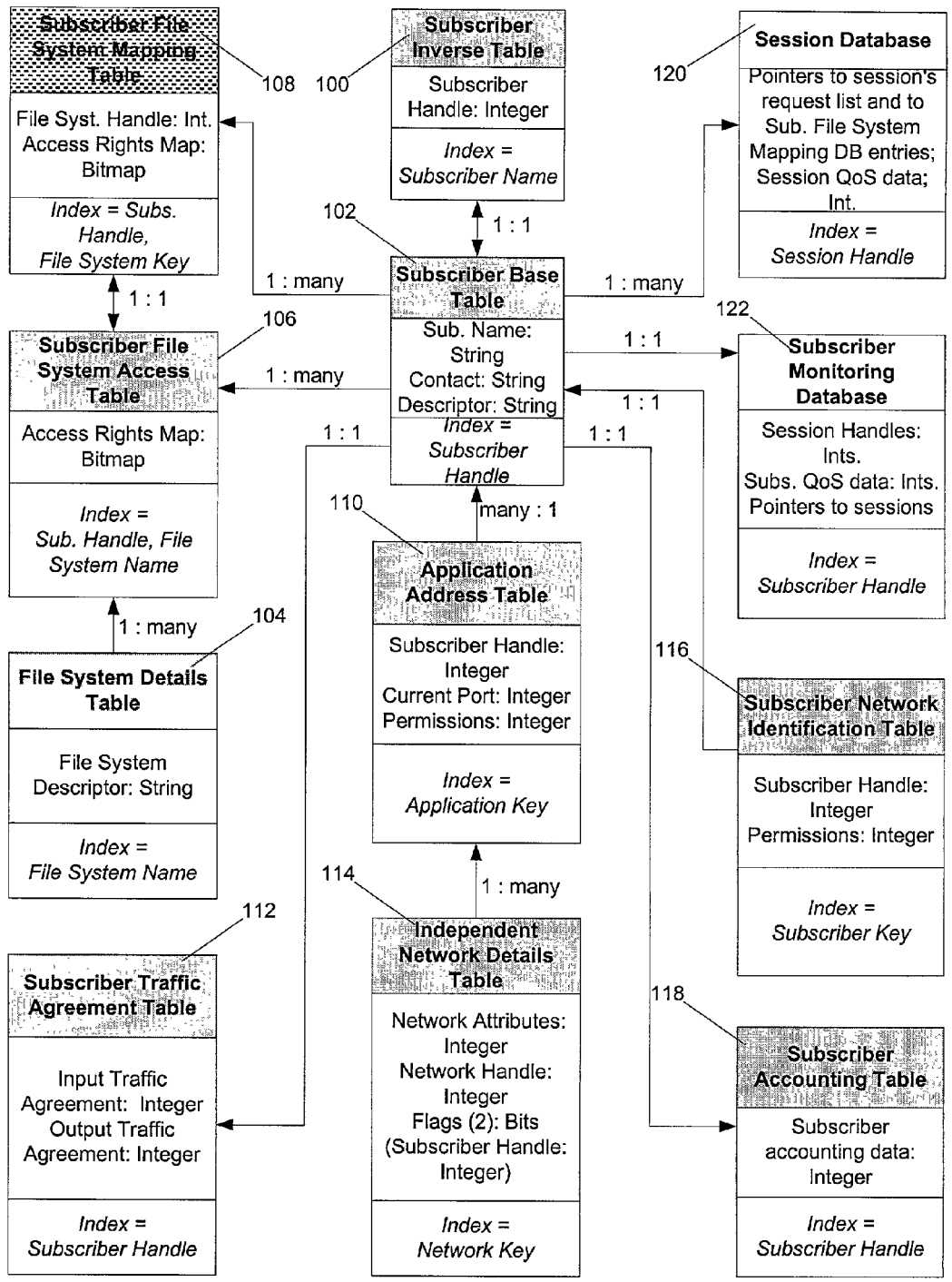
FIG. 1 is a depiction of the various data structures used to implement the security, quality of service and accounting features of the invention and an illustration of the interrelation among those structures.

For purposes of this description, the term "data service system" or simply "system" denotes the hardware and software used to implement the desired data center services and the term "subscriber" refers to a client given access to some subset of the available services and associated data. A subscriber typically consists of a number of users and host computers. Each subscriber is identified by a set of attributes, called the subscriber key, which uniquely distinguishes it from all other subscribers.

A subscriber is called a "registered subscriber" once the data system administrator has entered one or more "subscriber keys" into the appropriate database. Each subscriber key identifies computer systems, which are associated with the subscriber, by attributes in the input requests (such as source address information) and/or the system ports through which the subscriber has access into the data services system. The system administrator also enters the system resources that the subscriber can access. The registered subscriber can then manage its own resources within this larger context. For example, a subscriber may configure two or more "virtual subscribers" and the data center system administrator can then assign to each virtual subscriber its own set of one or more IP addresses, associated volume or file system, set of applications, and access rights.

Another important concept is a "session". A session is defined either inherently by the protocol used by the subscriber to communicate with the system or else by a subscriber-resource pair, that is, by a transaction initiated by a subscriber to get access to a particular system resource (for example, file system or logical volume). A session is opened on the first request for service received, and remains active so long as requests continue to be received, under that session. When no such requests are pending, the session is called inactive. An inactive session can be quickly reactivated if new requests are received under that session. Inactive sessions that have not received any requests for some predetermined time period may be closed to conserve system resources. Sessions can also be closed through a variety of means, depending on the communication protocol being used, including excessive idle time, log outs, administrative requests and other mechanisms. A subscriber is called "active" so long as any of its associated sessions are active; otherwise, it is called "inactive."

One embodiment of a data service system constructed in accordance with the principles of the invention comprises a set of integrated procedures for enabling a data service system efficiently to provide security, quality of service and accounting features. These procedures operate with a set of interrelated data structures for tracking subscribers and sessions and for determining their access privileges and the level of service to which they are entitled. The information in these structures is supplied either by the data center system administrator, by individual subscribers or computed by the data services system. In one embodiment, in order to simplify this process, this information is represented by Management Information Base (MIB) tables in compliance with the Internet Society RFC 1155 standard. Since the tables are in a standard format, their contents can be accessed and manipulated using the widely accepted Simple Network Management Protocol (SNMP).

Data structures used in one embodiment of the present invention are shown schematically in FIG. 1. Those structures that are organized as MIB tables are indicated by hatched title bars and are referred to as "tables" rather than the more generic term "databases". Base table 102 contains one entry for each subscriber and this entry includes the subscriber's name, contact information and optional additional descriptive information. The information for this entry is entered by the data system administrator. The entry is indexed by a unique number, called a "subscriber handle", that is assigned to each subscriber when the subscriber is registered. The mapping from the subscriber's name to the subscriber handle is also listed in inverse table 100 so that subsequent references to the subscriber's name can be easily converted to the appropriate handle. The inverse table is constructed internally without administrator intervention.

In this embodiment, when a subscriber attempts to access the system, it is identified by an entity, unique to that subscriber, called a "subscriber key". The subscriber key is composed of subscriber-specific attributes gleaned from the input request, the nature of which depends on the communication infrastructure. For storage-area networks using Fibre Channel, for example, the relevant attributes include the system port address, the Fibre Channel domain and area identifiers and the arbitrated loop port address (AL_PA). For Internet accesses, the subscriber key is constructed by the computer system from some subset of the following: the identity of the system port through which the request was received, the tag identifying the virtual local area net (VLAN) over which the input request was communicated, the source Internet Protocol (IP) address, the destination IP address and the source TCP or UDP port addresses. A subscriber can designate some of these parameters as "don't care", thereby enabling the subscriber to be represented by a range of addresses. Other parameters are used with other protocols and communication topologies.

The subscriber key, in addition to identifying the subscriber, can be used to prevent unauthorized access to resources assigned to the subscriber. Accordingly, the specific subset of attributes used to define the subscriber key depends, in part, on what is under physical control of the data center. If, for example, the data center controls the physical access to the VLAN, the system port address does not need to be included in the key used for Internet access since the VLAN-to-system port connections are secure. If the data center places source IP address-filtering router ports between the subscribers and the VLAN, then these addresses provide a means of secure subscriber identification. Similarly, if the data center includes equipment that independently identifies subscribers and assigns them a known set of TCP or UDP port addresses, then these addresses provide still another means for reliably identifying a subscriber. Nevertheless, source and network addresses that are not under control of the data center, such as Media Access Control (MAC) addresses and World Wide Names, may also be used to identify the subscriber. While these addresses can be counterfeited relatively easily, they still offer a level of protection against accidental intrusion.

For each entry in the base table 102, there is a corresponding entry, also indexed by the subscriber handle, in three other tables and databases: the subscriber accounting table 118, the subscriber traffic agreement table 112 and the subscriber monitoring database 122. The first of these tables, the subscriber accounting table 118, is used to record the amount of service provided to each subscriber and is periodically updated by the data center computer system with statistics reflecting each subscriber's system usage over the most recent accounting period. Typically included in this table are the number of operations performed by the subscriber and the amount of data received and transmitted during the current accounting period. Each subscriber can read its corresponding entry in the subscriber accounting table, thus allowing it to monitor its own level of activity.

The next two of these tables and databases, in combination, are used to guarantee each subscriber the quality of service to which it is entitled. The subscriber traffic agreement table 112 itemizes the level of service contracted for by the subscriber and includes the fraction of the system's capacity allocated to each subscriber in accordance with its service contract. Information can be entered into this table by both subscribers and data center personnel and enables subscribers to specify how these resources are to be allocated over different classes of sessions. Since the table can be accessed by a subscriber, the subscriber can specify its desired level of service and be billed accordingly.

The subscriber monitoring database 122 is used by the data center computer system to keep track of the on-going activity associated with each active subscriber. Each entry contains a counter recording the number of requests pending for that subscriber, a quality of service metric related to the fraction of the subscriber's allocated capacity that has been used, and pointers to other data structures indicating the order in which its sessions are to be serviced. These data structures, in turn, are based on quality of service metrics reflecting the fraction of the capacity allocated to each of the subscriber's sessions that has been consumed by that session. On simple example of a quality of service metric associated with a session is the ratio $C_u(i)/f(i)C_s$, with $C_u(i)$ the capacity thus far consumed by the subscriber's $i^{th}$ session and f(i) the fraction of the subscriber's allocated capacity $C_s$ assigned to that session. The quantity $C_u(i)$ is typically periodically renormalized to reflect the capacity used over the most recent time interval, in which case $C_s$ represents the capacity allocated per time interval. This information is used to ensure that each subscriber gets the quality of service that was contracted for, that that quality of service is allocated across its sessions in accordance with the subscriber's specifications, and, in particular, that no subscriber or session suffers inferior service due to excessive demand on the part of another subscriber or session.

Another data structure, the session database 120, is maintained by the data center system and used to expedite the processing of a request associated with an open session. Here a "session handle" is used as an index to an entry in the database that contains pointers to the lists of requests pending under that session and, if appropriate, to the relevant entry in the subscriber file system mapping database 106 (see below). In addition, each entry contains a metric related to the fraction of throughput allocated to the session that has been used at any given time. Each session is uniquely identified by its associated session handle constructed from the concatenation of the subscriber handle and a session key constructed from other fields extracted from the communication protocol header. In an Ethernet environment, for example, the session key is extracted from a subset of the protocol identifier, IP source and destination address and transport-layer source and destination port address fields. In a Fibre Channel networked environment, the node identification (N_ID) and the target logical unit number (LUN) are typically used.

In another embodiment, a subscriber has the capability to assign its sessions, distinguished by their session keys, to different priority classes and to assign different fractions of its total allocated system throughput to sessions in each class by manipulating information in the subscriber traffic agreement table. For example, the system administrator might assign all sessions having a specified destination IP address to a high priority class, thereby giving those sessions a larger fraction of the available throughput than they would otherwise have. To accommodate this option, the priority class of each session is extracted from the subscriber traffic agreement table 112 when the session is created and appended to metric associated with the session in the session database 120.

In still another embodiment, a concept called "session groups" is introduced. Session groups are used to prevent system performance from degrading because of excess demand for some subset of the system resources when other sessions that do not require that subset are eligible for service. In conventional systems, if the queue of requests for a specific resource (for example, a physical disk or communication port) reaches some prescribed limit, all subsequent requests are blocked until some of those requests have been serviced even though other system resources may not be fully utilized. In accordance with the principles of the present invention, in this embodiment, when a session is created by the data center system, it is assigned to a session group defined by the subset of the system resources that it uses (system port, storage volume, etc.). The group to which a session belongs is appended to its entry in the session database 120. Before any session is serviced, its session-group activity level is checked to determine if the session-group has reached capacity. If it has, the session is temporarily bypassed and another session made eligible for service. This prevents one session from being blocked by another session waiting for resources that the one session does not in fact need to become available.

In another embodiment, a quality of service metric and its implementation, depend on the operating environment, the acceptable computational complexity and the quality of service objectives. The metric itself is usually related to the fraction of the currently available throughput capacity that is allocated to the subscriber or session in question, but, alternatively, could involve the average latency experienced by a request or some combination of these and other measures.

For example, a throughput metric can be combined with an ordered-list structure to order sessions based on their associated metrics. With this structure, up to N active-session lists and one inactive list are defined for each subscriber and the number of sessions on, and a pointer to, each list are maintained in the subscriber monitoring database 122. The list headers represent the first time any session on that list, represented by its session handle, is entitled to service. For example, list 0 to contains the handles of all sessions currently eligible for service and list k contains the handles of those sessions that are next eligible to be serviced at time $T_k=T_1+(k-1)\Delta t$ with $\Delta t$ a predetermined time interval. An example of a throughput metric could be the number of bytes to write or read. Another could be the number of 32

KB blocks to write or read. Another could be the number of basic file system operations needed to service the request. The former two examples could be applied to ordinary data reads and writes. The latter applies well to directory reads, which typically are very operation intensive, but generate few bytes.

When an eligible session is selected for service, its pending requests are serviced in turn either until its associated group, subscriber or session limit has been reached, or until it has no requests left that have not been serviced. The session limit is reached when the throughput consumed by all requests serviced during its current service interval is estimated to exceed s-seconds worth of its allocated capacity for some prescribed value s. When this limit is reached, the session's handle is appended to list i, with i the largest integer for which $T_i<t+s$ and with t the current time, and the next eligible session is selected. If all the session's requests are serviced before it reaches this limit, its handle is placed on the inactive list along with the header of the list to which it would have been appended were it still active.

When a request is submitted to an application, the application responds with an estimate of the capacity that will be required to satisfy that request. The associated subscriber's metric is updated to reflect that estimate. If, following that update, the current subscriber still has unused capacity and if it still has requests that need service, then its next eligible request is serviced. Otherwise, the next eligible subscriber is selected. All of the new subscriber's sessions on any list j for which $T_j$ is less than or equal to the current time t are now eligible to run and all such lists are accordingly appended to list 0. If all of these lists, including list 0, are empty, the first non-empty list, say, list k, becomes the new list 0 even if $T_k>t$. If list i is the first list not linked to list 0, its header becomes the new $T_1$, the old header $T_{i+1}$ becomes the new $T_2$, etc. and new, temporarily empty lists are created with the headers $T_j=T_1+j\Delta t$ for $N-i<j<N-1$. The sessions are then serviced beginning with the first session on list 0. If all sessions on list 0 are serviced before the subscriber reaches its allocated capacity and the subscriber still has at least one active session, one or more non-empty lists are again linked to list 0 and the remaining list headers modified as before. If the subscriber has no active sessions, it is labeled inactive.

The allocation of the subscriber's capacity among its active sessions is effectively adjusted each time the subscriber becomes eligible for service in an attempt to keep the number of sessions on list 0 roughly equal to the number of sessions that can be serviced before the subscriber reaches its capacity. If, at the time that a subscriber becomes eligible for service, list k is the first non-empty list with $T_k$ greater than the current time t, the allocation to each session is proportionately increased. If, instead, the number of items on list 0 exceeds some prescribed number M, the allocation for each session is proportionately decreased.

Similarly, the allocation of the system's capacity among the active subscribers is periodically adjusted to reflect the total capacity currently available. A background task monitors the system parameters pertaining to each session group such as, for example, the lengths of the various system queues. This data is then dynamically updated each time a request is submitted for service, thereby keeping a current estimate of the capacity available to each session group. If these parameters indicate that a session group is approaching maximum capacity, the effective allocation to that group is proportionally reduced; if they indicate that a session group is underutilized, its effective allocation is proportionally increased. Session group allocations are distributed among the active subscribers in accordance with their contracted levels of service.

The sum of the available capacities of the session groups is used to define the available system capacity. Active subscribers are serviced in a round-robin manner. Each subscriber is allocated a portion of its share of the available system capacity each time it is made eligible for service and, if the current subscriber reaches the temporary limit imposed by this system-level allocation, the request service routine moves to the next subscriber on the active list. The portion of the system's capacity made available to a subscriber during any given service interval is generally less than 100% of its full share of that capacity. The function of the system capacity parameter, therefore, is to limit the likelihood that any one subscriber can exhaust the capacity available to any given session group before other subscribers have had a chance to submit requests requiring resources belonging to that same session group. The portion of the system capacity that is allocated on any one round involves a tradeoff between performance and fairness. If too little capacity is made available, each subscriber is able to submit only a small number of requests before the request service routine moves to the next subscriber resulting in computational inefficiencies. If too much capacity is made available, early subscribers may effectively prevent later subscribers from getting their fair share of some of the system's resources.

The various allocations are, of course, also increased or reduced, as appropriate, when the number of active subscribers or sessions changes due to active subscribers or sessions becoming inactive or vice versa. The result of all this is that the fraction of the system's capacity allocated to a subscriber is a function of the number of subscribers and the contracted level of service for each subscriber. Similarly, the fraction of a subscriber's share of the system's capacity allocated to any one of its sessions is a function of the relative priority assigned to the session, the relative fraction of the total system capacity that is available to the session's group, and the number of the subscriber's other sessions belonging to that group.

Another embodiment of the present invention provides subscribers with two levels of security. (A third level is typically provided by the subscriber-specific application itself.) The first of these levels, the network security level, ensures that only registered subscribers are able to gain access to the system through the network ports for which they have contracted or, in cases where this level of screening is not appropriate, that only those destinations specified by the subscriber are allowed to receive information through those ports. The second security level, the resource security level, ensures that each subscriber's resources can be accessed only in the manner specified for each member of the subscriber's group.

In this embodiment, the first level of security (network security) is provided by the concept of an "independent network." An independent network is a network configuration that is logically separate from all other independent networks in the system, thereby allowing the configuration and routing rules to be independently defined for each such network. Each independent network is isolated from all other networks for security purposes; no packets of information can pass from one such network to another through the system. Moreover, an independent network can be directly connected to an external network, such as the Internet or a subscriber's own private network, and can be made consistent with the attached network's configuration requirements. This level of security assumes that the physical components, which provide the independent network, are under total control of a network administrator trusted by the data center administrator.

The independent network structure enables the system to provide network-level security by associating each independent network with a unique set of destination IP addresses. No access is allowed over an independent network to any destination address other than those that have been assigned to it. These access rules are enforced using three different MIB tables: the independent network details table 114, the application address table 110 and the subscriber network identification table 116.

The independent network details table 114 contains an entry for each independent network identifying the characteristics of that network. It is indexed by a "network key" consisting of a subset of those parameters used to identify the subscriber (the previously defined subscriber key). For Ethernet access, for example, the VLAN tag or the physical connection, or both, can be used for this purpose. For an ATM connection, the network is identified by the set of virtual circuits comprising that connection. For Fibre Channel, the network is defined by the system port to which it is physically connected.

The information listed in table 114 for each independent network includes the attributes of that network (system ports used by that network, protocols supported, etc.), the network handle assigned by the system and used elsewhere to identify the independent network and two flags. The first of these flags, when set, indicates that the source subscriber (the subscriber initiating the access) and destination subscriber (the subscriber controlling the resources being accessed) are identical and, hence, that no other access permissions are required. In this case, the subscriber handle is also part of the entry for that independent network so no additional table lookups are needed to identify it.

The second flag indicates that the controlling subscriber is the destination subscriber, as is true, for example, for normal Internet accesses. In this case, the application address table 110 must be consulted to determine the controlling subscriber handle, access permissions and the system port to be used in responding to this access. The relevant entry into table 110 is indexed by another key called the "application key." The application key consists of the network handle, extracted from table 114, combined with other information received along with the request. The specific information used is again dependent on the communication protocol in effect, but typically includes the destination IP address and the UDP or TCP port number being used.

If neither flag is set, the relevant subscriber is the source subscriber and the subscriber handle and the associated access permissions must be extracted from the subscriber network identification table 116. The previously defined subscriber key is used as the index into this table. Table 116 has an entry containing a permissions field for each valid key. If the subscriber key is listed, indicating that the subscriber in question is registered for access through the specified system port using the specified network address, and permission is given for the type of access requested, access is allowed. Otherwise, the attempted access is rejected.

In addition to providing network-level security, the independent network structure is also used to increase system availability. Typically, an independent network has multiple physical ports for accessing the system. Subscribers connected to the data center over a switched network, for example, can usually reach multiple system ports. Associating these ports with an independent network gives the subscriber the ability to access the system through any of the ports belonging to its associated independent network. Requests that come in through one port can be responded to through another port in the same network, thereby enabling traffic to be managed more efficiently. The independent network structure also allows another port to take over the role of a failed port without affecting connectivity.

In this embodiment, the second level of security, resource-level security, is implemented using three other MIB tables: the file system details table 104, the subscriber file system access table 106 and the subscriber file system mapping table 108. The contents of the first two of these tables can be manipulated by a data system administrator to define file systems (table 104) and to assign access rights to them (table 106). The first of these tables is indexed by the file system name (i.e., the name assigned to the file system by its creator) and the second by a concatenation of the file system name with the handle of the subscriber for which the access privileges are being defined. If the indexed entry is present in table 106, the subscriber in question has the specified access privileges (e.g., NFS read, NFS write, FTP read, FTP write, CIFS read, CIFS write, HTTP read, HTTP write).

The entries in the subscriber file system mapping table 108 are determined by the subscriber, but the system reconciles those entries with the entries in table 106 to prevent any subscriber from attempting to gain access to any file system to which it is not entitled. The table 108 entries are indexed by a file-system key rather than the file-system name. The definition of the file-system key is protocol and application dependent. In some applications, for example, the system administrator provides the subscriber with unique logical-unit numbers (LUNs) that map to specific storage volumes, e.g., storage-area network (SAN) file systems. For Internet applications, the file system key is equated to the universal resource locator (URL) address. In all cases, however, the file system key can be extracted from the information received with the request and hence can be concatenated with the subscriber handle to locate the relevant access privileges in table 108.

The MIB tables are all stored as flat databases. Using these databases, any member of a subscriber group can monitor and control the subscriber's resources through writeable files or Simple Network Management Protocol (SNMP) commands. The MIB tables define the parameters that the subscriber can manipulate and the allowed limits on those parameters. For example, by manipulating the information in the subscriber file system mapping table 108, the subscriber can define several virtual subscriber subgroups, each having its own IP address. The subscriber can then associate with each subgroup the volume or file system to which the subgroup has access, the number of active sessions that the subgroup can maintain at any one time, its URL (Uniform Resource Locator) maps, its user password and the group to which it is assigned. In addition, the subscriber can access these databases to specify its service agreement and to monitor its system utilization parameters.

Figure 2:
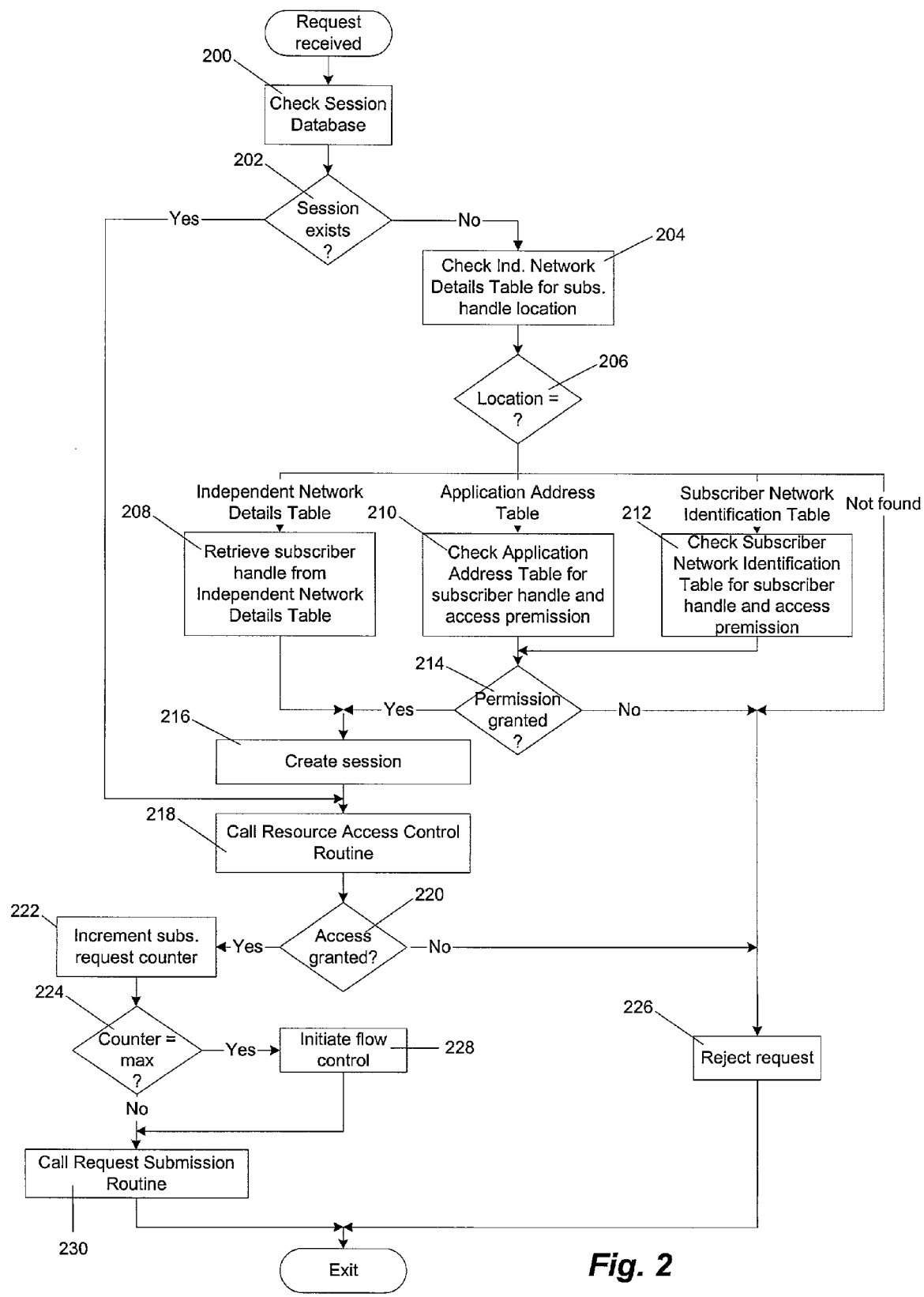
FIG. 2 is a flowchart showing the response to a request for service in accordance with the principles of the invention and, in particular, the procedure by which the legitimacy of an access request is determined.

The use of some or all of these various tables and lists can be illustrated by tracing the system's response to a subscriber's access request in accordance with an embodiment of the invention. The first routine to handle a request is called a network access control routine and the steps involved in this routine are shown in the flowchart in FIG. 2.

The routine begins when a new request for service is received by the system. In step 200, the network access control routine first checks the session database 120 for the session handle and, in step 202, the routine determines whether the request is part of an ongoing session. Specifically, if the session already exists, its handle will be found in the session database and the subscriber's network access permissions will have already been established and verified and hence do not have to be reestablished. In this case, the routine proceeds to step 218 where another routine called a resource access control routine is then called to enforce the second level of security, that is, to determine if the requester has the necessary permissions to access the requested resource. This latter routine is discussed below and makes a decision in step 220 whether to grant or to deny access. If the access request is not accepted, the resource access control routine returns with an "access denied" message and the request is rejected by the network access control routine in step 226. The network access control routine then finishes.

If the access request is accepted in step 220, the subscriber's pending request counter is incremented in step 222 and, in step 224, a determination is made if the counter has reached a prescribed limit. If a determination is made in step 224 that the counter has reached the limit, the routine proceeds to step 228 where flow control is initiated for that subscriber, thereby preventing any new requests from being accepted until at least one of the pending requests has been served.

In any case, the network access control routine proceeds to step 230 where a routine called the request submission routine is then called and the network access control routine finishes.

If, in step 202, no session database matching entry is found, the routine proceeds to step 204 where the independent network details table 114 is accessed using the network key as the first step in identifying the controlling subscriber. A determination is made in step 206, based on the results of this access. If an entry corresponding to the network key is not found in table 114, the routine proceeds to step 226 where the request is immediately rejected. The routine then finishes.

Otherwise, an entry is retrieved and the two flags of the entry are examined as described above in connection with FIG. 1. Depending on which, if either, of the two flags is set, the handle for the controlling subscriber may be extracted from the independent network details table 114 itself as set forth in step 208. Alternatively, the handle can be obtained from the application address table 110 as set forth in step 210 or the handle can be obtained from the subscriber network identification table 116 as set forth in step 212.

In particular, if the source and destination subscribers are identical, as indicated by one of the flags in the entry retrieved from table 114, the handle of the controlling subscriber can be extracted from table 114 and permission is automatically granted since the subscriber in control of the resource is also the subscriber requesting access to that resource. If, however, this is not the case, then the information retrieved from either table 110 or table 116, as determined by the second flag, yields both the controlling subscriber handle and the access permissions specified by that subscriber, as previously discussed.

A determination is then made in step 214 whether permission to access the resources will be granted. If, based on the information retrieved from tables 110 and 116, permission is not granted in step 214, the routine proceeds to step 226 where the session is rejected and the routine finishes. Otherwise, a new session is created as shown in step 216.

Creating a session entails several steps. First, if the subscriber was previously not active, an entry for it is inserted in the subscriber monitoring database 122. This, in turn, involves checking the subscriber traffic agreement table 112 to determine the contracted level of service for that subscriber. Second, the session handle is appended to the subscriber monitoring database entry for the subscriber. If the previously described metric is used, for example, the new session is appended to the subscriber's list 0. Third, an entry for that session is inserted into the session database 120 listing the new request, identifying the session's session group and, if priority levels are used, specifying its associated priority level as specified in table 112.

Once the session has been created, the routine proceeds through steps 218 through 230 as previously described.

Figure 3:
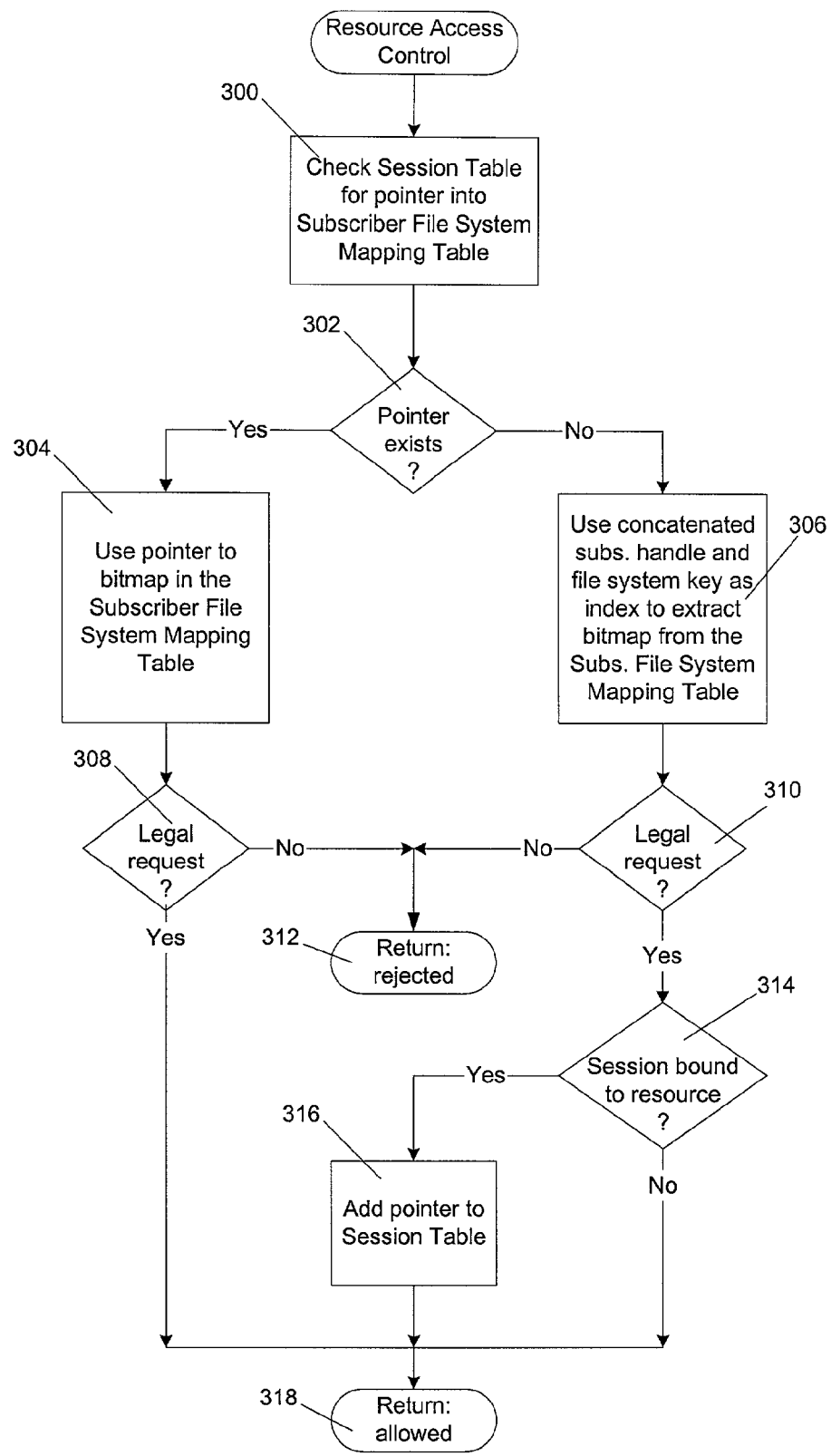
FIG. 3 is a flowchart depicting the procedure used to determine if a user requesting access to a specific system resource in fact has permission to access that resource.

A flowchart describing the steps taken in the aforementioned resource access control routine is shown in FIG. 3. When this routine is called, in step 300, it first checks the session database 120 to determine if a pointer is present, which pointer can be used to access the subscriber file system mapping database 108. If such a pointer is present as determined in step 302, then the routine proceeds to step 304—where that pointer is used to access directly a bitmap entry in database 108 containing the relevant access permissions. If, based on these permissions, the access is determined to be legitimate in step 308, the routine returns with an "access allowed" return value as set forth in step 318. Alternatively, if, in step 308, it is determined that the request is not legal, then the routine returns with an "access rejected" return value in step 312.

If, in step 302, no pointer is found in the session database 120, the routine proceeds to step 306 where the catenation of the subscriber handle and the file system key is used as an index to search through the subscriber file system mapping database 108 in order to find the governing access permissions. If the access attempt is found to be illegal in step 310, the routine proceeds to step 312 and returns with an access rejected return value. If the access is permitted as determined in step 310, since the session database 120 does not already contain a pointer into database 108 (as determined in step 300), the routine first determines whether the file session is bound to the resource being accessed in step 314. A session is bound to a resource if all requests submitted as part of that session are constrained to access only that resource. This, in turn, is a function of the type of session that has been created. NFS sessions using TCP, for example, are bound to a specific file system or mount point; NFS sessions using UDP are not. Similarly, HTTP sessions can be either persistent sessions, which are not bound to a resource, or non-persistent sessions that are bound to a resource.

If, as determined in step 314, the session is bound to a resource, in step 316, a pointer to the relevant permission entry in the subscriber file system mapping database 108 is inserted into the session database 120, thereby expediting the service of subsequent requests made during that same session. If the session is not bound to the resource, this of course cannot be done since the next request under that session may well be for some other resource, so the entry pointed to would no longer be relevant. In either case, the routine returns with an access granted return value in step 318.

Figure 4:
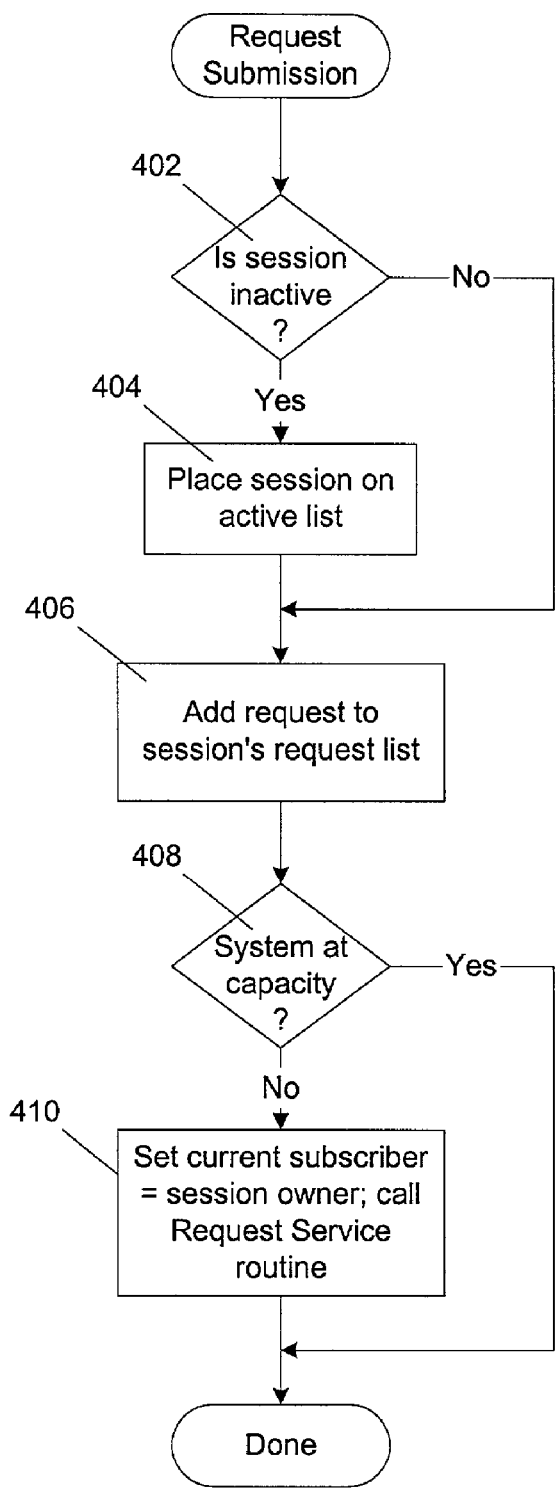
FIG. 4 is a flowchart showing the procedure for placing a request that has been determined to be legitimate on the appropriate list of requests awaiting service.

The steps of the request submission routine are depicted in the flowchart in FIG. 4. When called, the routine proceeds to step 402 where a determination is made whether the associated session is active. If the determination is made that the association is not active, it is activated in step 404 by moving the session from the inactive list identified in the relevant subscriber monitoring database entry to the appropriate active list location, as determined by the inactive session's most recent metric (next eligible service time using the previously described ordered-list implementation). In step 406, the request is added to the session's list of requests, identified by a pointer in the session database 120. Next, in step 408, the previously mentioned performance parameters that are maintained by system-level performance monitoring background task are checked, to determine if the system is running at capacity. If the system is at capacity, the routine exits. If the system is not at capacity, the request submission routine calls the request service routine in step 410 and then exits.

Figure 5:
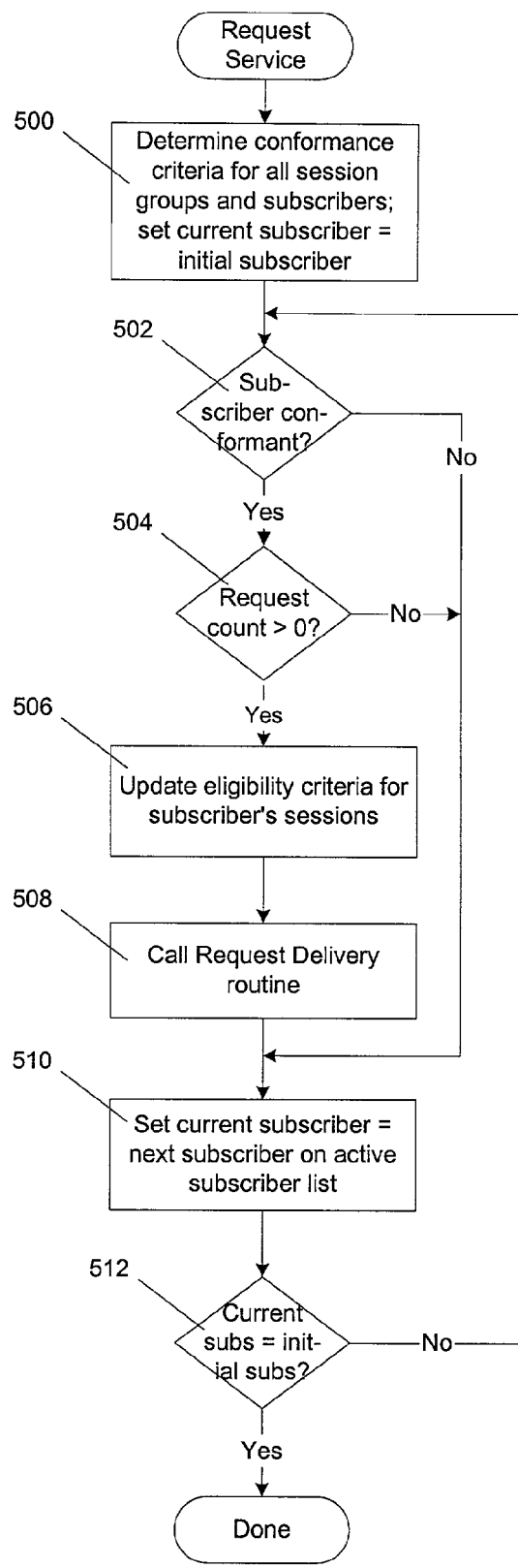
FIG. 5 is a flowchart illustrating the procedure for cycling through the set of active subscribers and determining the subscriber that is next eligible for service.

A flow chart for the request service routine is shown in FIG. 5. A subscriber, or session, is called "conformant" if its metric does not exceed the current metric threshold for that subscriber or session. The request service routine cycles through all of the active subscribers, servicing each subscriber's active sessions in turn, until either all of the subscribers active sessions have been serviced or until the subscriber is no longer conformant. To make this possible, session metric thresholds may be increased periodically so long as the subscriber is conformant and there are still requests pending. A session is said to be eligible for service if it is conformant.

The request service routine is always called with the handle of a subscriber called the "initial subscriber". On being called, in step 500, the routine first determines the conformance criteria for each active subscriber and then equates the current subscriber pointer to the initial subscriber. The conformance criteria determination is made by first estimating the current capacity available to each session group based on parameters generated by the background performance-monitoring task and updated with the demand represented by the requests that have been submitted since that task was last run. The capacity available to each session group is then apportioned among the active subscribers in compliance with their contracted levels of service. Finally, the system capacity is equated to the sum of the session group capacities and a portion of that capacity is allocated to each subscriber as previously described.

Once the conformance criteria have been determined, in step 502, a further determination is made whether the current subscriber is conformant, that is, if it has not already exceeded its allocated portion of the system's capacity. If the subscriber is determined to be conformant, then the routine proceeds to step 504 where it is determined whether the subscriber has any pending requests.

If there are pending requests, then, in step 506, the session threshold metric is updated so that at least one session is conformant. If the aforementioned ordered list implementation is used to order sessions, this step entails re-labeling and, where necessary, coalescing the session lists based on the current time as previously described. The request service routine then calls the request delivery routine (described below) in step 508. When the latter routine completes, in step 510, the request service routine equates the current subscriber to the next active subscriber in the subscriber monitoring database 122 and, if the current subscriber is again the initial subscriber, as determined in step 512, indicating that all active subscribers have been serviced, the routine exits. Otherwise, the routine loops back to step 502 and continues with steps 504-510. Whenever a subscriber is encountered that is either no longer conformant (as determined in step 502) or has no pending requests (as determined in step 504), the routine immediately proceeds to the next active subscriber as set by step 510.

Figure 6:
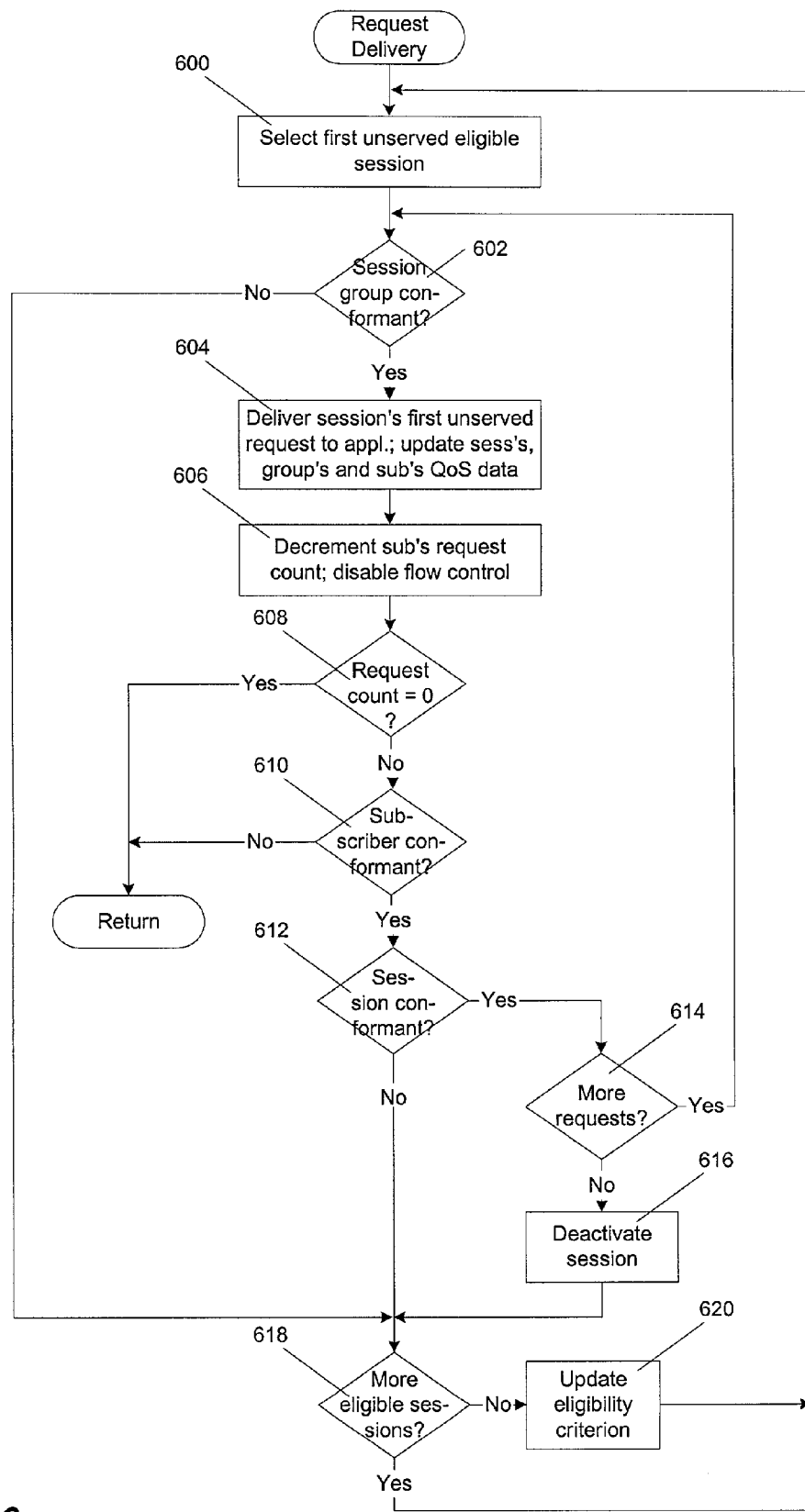
FIG. 6 is a flowchart showing the procedure for cycling through a subscriber's active sessions, identifying those sessions eligible for service and delivering those sessions' requests to the appropriate application.

The request delivery routine is illustrated by the flowchart shown in FIG. 6. This routine cycles through all eligible sessions for the current subscriber and, for each eligible session, submits the session's pending requests one-by-one until that session is no longer eligible for further service. After being called, in step 600, the subscriber's first eligible unserved session is selected and, in step 602, a check is made to determine if the selected session belongs to a conformant session group.

If the selected session belongs to a conformant group, then, in step 604 the first pending request of the selected session is delivered to the appropriate application and, based on information returned by the application, the quality-of-service data of the subscriber, the session group and the session is updated to reflect the estimated throughput capacity needed to service that request.

Next, in step 606, a counter containing the number of requests pending for that subscriber is decremented and, if the subscriber had been previously placed under flow control, that restriction is removed, since the submission of one of its requests to the application makes room for one more request on the subscriber's request-pending queue.

If, following the submission of the request, the subscriber either has no more pending requests as determined in step 608 or is no longer conformant as determined in step 610, the routine returns. Otherwise, the routine proceeds to step 612 where the session is tested for conformance. If the session is still conformant and still has requests pending as determined in step 614, the routine returns to step 602 and repeats the sequence of steps 602-612. Alternatively, if, in step 614, it is determined that the session has no more requests, the session is put on the inactive list in step 616.

If the session either has been deactivated in step 616, is no longer conformant (as determined in step 612) or was found to belong to a non-conformant session group in step 602 the routine proceeds to step 618 where a determination is made whether the subscriber has other eligible sessions. If it does, the routine returns to step 600 and selects the next eligible session. If, however, no more sessions are eligible, then the eligibility criterion is adjusted in step 620 before returning to step 600. The eligibility criteria are changed because the subscriber has already been determined to be conformant and has pending requests. Thus, next most nearly eligible sessions need to be made eligible in order to satisfy the quality of service to which the subscriber is entitled. If the previously described ordered-list implementation is used to order sessions, step 620 involves linking the first non-empty list of sessions to list 0 and may also entail re-labeling and, where necessary, coalescing the session lists based on the current time.

Figure 7:
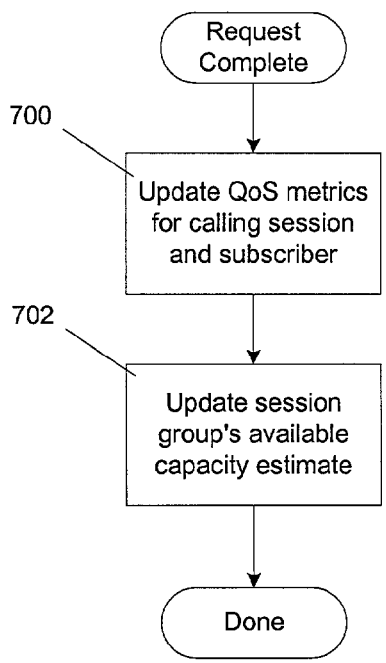
FIG. 7 is a flowchart showing the activities undertaken when a request has been serviced by an application.
Figure 8:
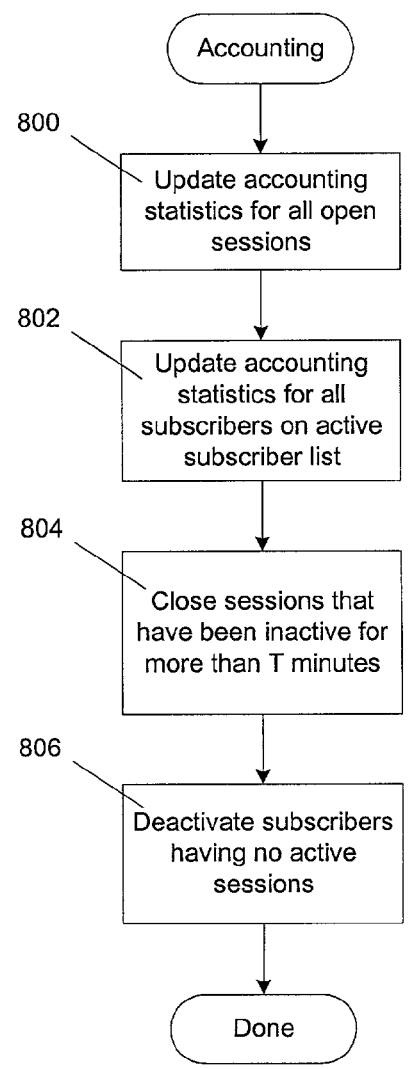
FIG. 8 is a flowchart illustrating the accounting procedure whereby data reflecting subscribers' and sessions' system usage is collected and updated.

Two other routines are needed to implement an embodiment of the present invention: a request complete routine and an accounting routine. Flow charts for these two routines are depicted in FIGS. 7 and 8, respectively. The request complete routine in FIG. 7 is called by the relevant application after each request submitted to it has been serviced by that application. Since the original estimate of the capacity needed to service a request, which was returned to the request delivery routine (illustrated in FIG. 6), may be imprecise, because the throughout capacity needed to service the request may not have been calculable or predictable before servicing the request, the first step 700 in the request complete routine updates the relevant session metric with the difference between the estimated and the actual amount of data transferred in servicing the request. This is accomplished by requiring the application to provide that difference when it calls the request complete routine and then using that information to update the metric stored along with the session handle in the session database 120. This information is subsequently used when the subscriber and session metrics are updated in the request service routine and the request delivery routine. Specifically, the difference between the estimated and actual demand is used to increment or decrement, as appropriate, the new capacity allocation for that subscriber and session.

Next, in step 702, the request complete routine then updates the estimate of the capacity available to the session group in question. Since the request has been serviced, the capacity previously reserved for servicing it can be released to other requests pending in that same session group.

An accounting routine, such as that illustrated in FIG. 8 is run periodically to update the information in the subscriber accounting table 118. When run, this routine first updates the accounting information for each open session in step 800 by sequencing though the session database and capturing the recent throughput data for each session. In step 802, the data associated with each of a subscriber's sessions is then combined to update the accounting information for each active subscriber. Next, in step 804, the inactive session list is scanned for each active subscriber and those sessions that have been inactive for some predetermined time period are closed, pruning them from the session database 120. Finally, all subscribers having no active sessions are removed from the active subscriber list in step 806. Both of these last two steps prevent the session database and the subscriber monitoring database 122 from becoming unnecessarily large, thereby significantly improving computational efficiency.

A software implementation of the above-described embodiment may comprise a series of computer instructions either fixed on a tangible medium, such as a computer readable medium, e.g. a diskette, a CD-ROM, a ROM memory, or a fixed disk, or transmissible to a computer system, via a modem or other interface device over a medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system, other hardware and system software could be used in the same manner as that described. Other aspects, such as the specific instructions utilized to achieve a particular function, as well as other modifications to the inventive concept are intended to be covered by the appended claims.

What is claimed is:

1. A method for partitioning network data services among multiple subscribers, to allow multiple source subscribers to selectively access a plurality of resources that provide data services and to which access is controlled by a plurality of destination subscribers, each destination subscriber being located at a destination address, the method comprising:

(a) defining a plurality of independent networks, each independent network comprising a set of access ports and a unique set of destination addresses, having data associated therewith that indicates whether the source subscriber and the destination subscriber are identical and data associated therewith that indicates whether the destination subscriber controls access to resources connected to that independent network and being logically separate from all other independent networks so that no information can pass from one independent network to another independent network;

(b) when a source subscriber with an identity makes a request to use a first independent network to connect to a destination subscriber and access a resource, using the identity to determine whether the source subscriber has permission to use the first independent network;

(c) if the source subscriber has permission to use the first independent network, accessing the data associated with the first independent network and using the data to determine whether the source subscriber and the destination subscriber are identical and, if so, allowing the source subscriber to access resources to which that destination subscriber controls access;

(d) if the source subscriber and the destination subscriber are not identical, accessing the data associated with the first independent network and using that data to identify which of the source subscriber or a destination subscriber controls access to the resource and, when that data indicates that a destination subscriber controls access to the resource, using information in the request to identify a destination subscriber, access permissions and a response port;

(e) if the data accessed in step (d) indicates that a source subscriber controls access to the resource, using the identity to determine whether the source subscriber can access the resource; and (f) selectively providing the source subscriber access to the resource based on one of the access permissions identified in step (d) and the determination in step (e).

2. The method of claim 1 wherein the identity identifies an access port by which the source subscriber is accessing the first independent network.

3. The method of claim 1 wherein step (a) comprises storing in a first database information for each source subscriber defining each independent network to which that source subscriber has access.

4. The method of claim 3 wherein step (b) comprises using the identity to access the first database and to determine whether information concerning the first independent network resides in the first database and, if so, to retrieve that information.

5. The method of claim 4 wherein step (c) comprises using flags in a database associated with the first network to determine whether the source subscriber is identical to the destination subscriber.

6. The method of claim 5 wherein step (d) comprises using the information concerning the first network and information in the request to access a second database and to retrieve an identify of a destination subscriber and a response port.

7. The method of claim 5 wherein step (e) comprises using the identity to access a third database to determine whether information concerning the source subscriber resides in the third database and, if so, to retrieve permission information from the third database.

8. The method of claim 1 further comprising:
(g) using a fourth database to store information entered by an administrator of the data center defining a plurality of file systems;
(h) using a fifth database to store information entered by an administrator of the data center defining access privileges of the multiple subscribers to file systems defined by information in the first database;
(i) using a sixth database to store information entered by the multiple subscribers defining subgroups of subscribers and assigning each subgroup to a file system defined by the first database; and
(j) reconciling the information in the sixth database to the information in the fourth database to prevent the multiple subscribers from accessing a file system to which they do not have access.

9. The method of claim 8 wherein the sixth database is structured in accordance with a management information base protocol.

10. Apparatus for partitioning network data services among multiple subscribers, to allow multiple source subscribers to selectively access a plurality of resources that provide data services and to which access is controlled by a plurality of destination subscribers, each destination subscriber being located at a destination address, the apparatus comprising:
means for defining a plurality of independent networks, each independent network comprising a set of access ports and a unique set of destination addresses, having data associated therewith that indicates whether the source subscriber and the destination subscriber are identical and data associated therewith that indicates whether the destination subscriber controls access to resources connected to that independent network and being logically separate from all other independent networks so that no information can pass from one independent network to another independent network;
when a source subscriber with an identity makes a request to use a first independent network to connect to a destination subscriber and access a resource, first means for using the identity to determine whether the source subscriber has permission to use the first independent network;
if the source subscriber has permission to use the first independent network, means for accessing the data associated with the first independent network and using the data to determine whether the source subscriber and the destination subscriber are identical and, if so, allow the source subscriber to access resources to which that destination subscriber controls access;
second means operable if the source subscriber and the destination subscriber are not identical, for accessing the data associated with the first independent network and using that data to identify which of the source subscriber or a destination subscriber controls access to the resource and, when that data indicates that a destination subscriber controls access to the resource, using information in the request to identify a destination subscriber, access permissions and a response port;
if the data accessed by the second means indicates that a source subscriber controls access to the resource, third means for using the identity to determine whether the source subscriber can access the resource; and
means for selectively providing the source subscriber access to the resource based on one of the access permissions identified by the second means and the determination made by the third means.

11. The apparatus of claim 10 wherein the identity identifies an access port by which the source subscriber is accessing the first independent network.

12. The apparatus of claim 10 wherein the means for defining a plurality of independent networks comprises a first database and means for storing in the first database information for each source subscriber defining each independent network to which that source subscriber has access.

13. The apparatus of claim 12 wherein the first using means comprises means for using the identity to access the first database and to determine whether information concerning the first independent network resides in the first database and, if so, to retrieve that information.

14. The apparatus of claim 13 wherein the means for determining comprises means for using flags in a database associated with the first network to determine whether the source subscriber is identical to the destination subscriber.

15. The apparatus of claim 14 wherein the second means for using comprises a second database and means for using the information concerning the first network and information in the request to access the second database and to retrieve an identify of a destination subscriber and a response port.

16. The apparatus of claim 14 wherein the third means for using comprises a third database and means for using the identity to access the third database to determine whether information concerning the source subscriber resides in the third database and, if so, to retrieve permission information from the third database.

17. The apparatus of claim 10 further comprising:
a fourth database and means for using the fourth database to store information entered by an administrator of the data center defining a plurality of file systems;
a fifth database and means for using the fifth database to store information entered by an administrator of the data center defining access privileges of the multiple subscribers to file systems defined by information in the first database;
a sixth database and means for using the sixth database to store information entered by the multiple subscribers defining subgroups of subscribers and assigning each subgroup to a file system defined by the first database; and
means for reconciling the information in the sixth database to the information in the fourth database to prevent the multiple subscribers from accessing a file system to which they do not have access.

18. The apparatus of claim 17 wherein the sixth database is structured in accordance with a management information base protocol.

19. A computer program product for partitioning network data services among multiple subscribers, to allow multiple source subscribers to selectively access a plurality of resources that provide data services and to which access is controlled by a plurality of destination subscribers, each destination subscriber being located at a destination address, the computer program product comprising a computer usable storage medium having computer readable program code thereon, including:
program code for defining a plurality of independent networks, each independent network comprising a set of access ports and a unique set of destination addresses, having data associated therewith that indicates whether the source subscriber and the destination subscriber are identical and data associated therewith that indicates whether the destination subscriber controls access to resources connected to that independent network and being logically separate from all other independent networks so that no information can pass from one independent network to another independent network;

first program code operable when a source subscriber with an identity makes a request to use a first independent network to connect to a destination subscriber and access a resource, for using the identity to determine whether the source subscriber has permission to use the first independent network;

program code operable if the source subscriber has permission to use the first independent network, for accessing the data associated with the first independent network and using the data to determine whether the source subscriber and the destination subscriber are identical and, if so, allowing the source subscriber to access resources to which that destination subscriber controls access;

second program code operable if the source subscriber and the destination subscriber are not identical, for accessing the data associated with the first independent network and for using that data to identify which of the source subscriber or a destination subscriber controls access to the resource and, when that data indicates that a destination subscriber controls access to the resource, for using information in the request to identify a destination subscriber and a response port;

third program code operable if the data accessed by the second program code indicates that a source subscriber controls access to the resource, for using the identity to determine whether the source subscriber can access the resource; and program code for selectively providing the source subscriber access to the resource based on one of the access permissions identified by the second program code and the determination made by the third program code.

20. The computer program product of claim 19 wherein the identity identifies an access port by which the source subscriber is accessing the first independent network.

21. The computer program product of claim 19 wherein the program code for defining a plurality of independent networks comprises program code for storing in a first database information for each source subscriber defining each independent network to which that source subscriber has access.

22. The computer program product of claim 21 wherein the first program code for using comprises program code for using the identity to access the first database and to determine whether information concerning the first independent network resides in the first database and, if so, to retrieve that information.

23. The computer program product of claim 22 wherein the determining means comprises means for using flags in a database associated with the first network to determine whether the source subscriber is identical to the destination subscriber.

24. The computer program product of claim 23 wherein the second program code for using comprises program code for using the information concerning the first network and information in the request to access a second database and to retrieve an identify of a destination subscriber and a response port.

25. The computer program product of claim 23 wherein the third program code for using comprises program code for using the identity to access a third database to determine whether information concerning the source subscriber resides in the third database and, if so, to retrieve permission information from the third database.

26. The computer program product of claim 19 further comprising:

program code for using a fourth database to store information entered by an administrator of the data center defining a plurality of file systems;

program code for using a fifth database to store information entered by an administrator of the data center defining access privileges of the multiple subscribers to file systems defined by information in the first database;

program code for using a sixth database to store information entered by the multiple subscribers defining subgroups of subscribers and assigning each subgroup to a file system defined by the first database; and program code for reconciling the information in the sixth database to the information in the fourth database to prevent the multiple subscribers from accessing a file system to which they do not have access.

* * * * *